R. P. VASTINE.
GAGE GLASS ILLUMINATOR.
APPLICATION FILED OCT. 20, 1914.
1,293,993.
Patented Feb. 11, 1919.
2 SHEETS—SHEET 1.
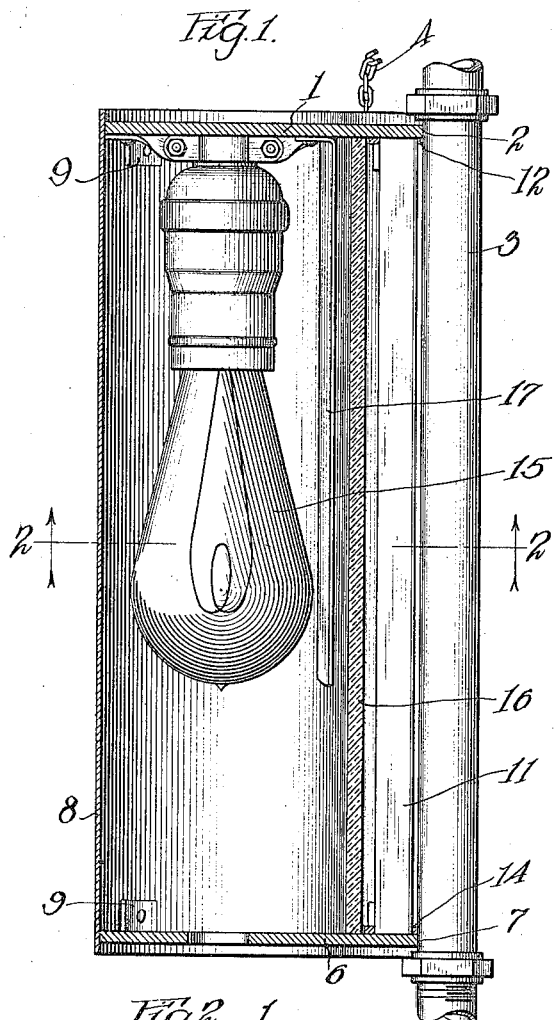
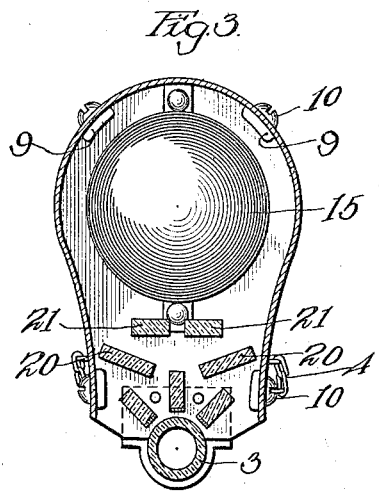
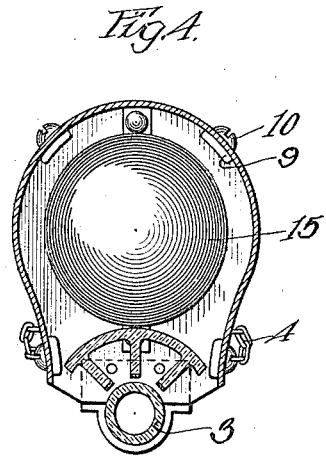
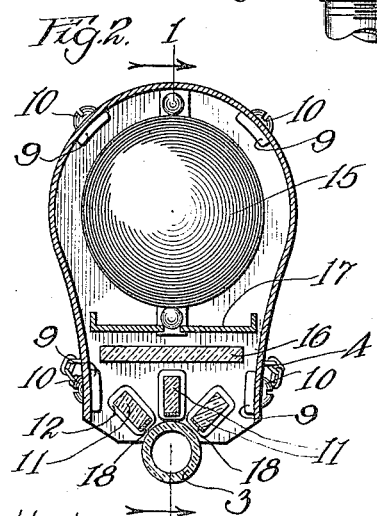
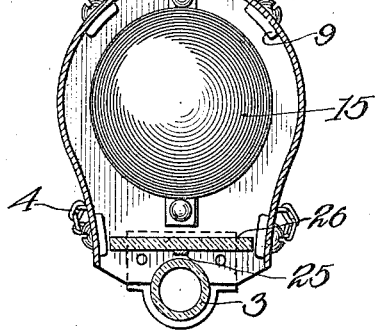
Witnesses:
Leo J. DuMais.
Arthur B. Framke.
Inventor:
Ray P. Vastine
By Burton A. Hill
Atty.

R. P. VASTINE.
GAGE GLASS ILLUMINATOR.
APPLICATION FILED OCT. 20, 1914.
1,293,993. Patented Feb. 11, 1919.
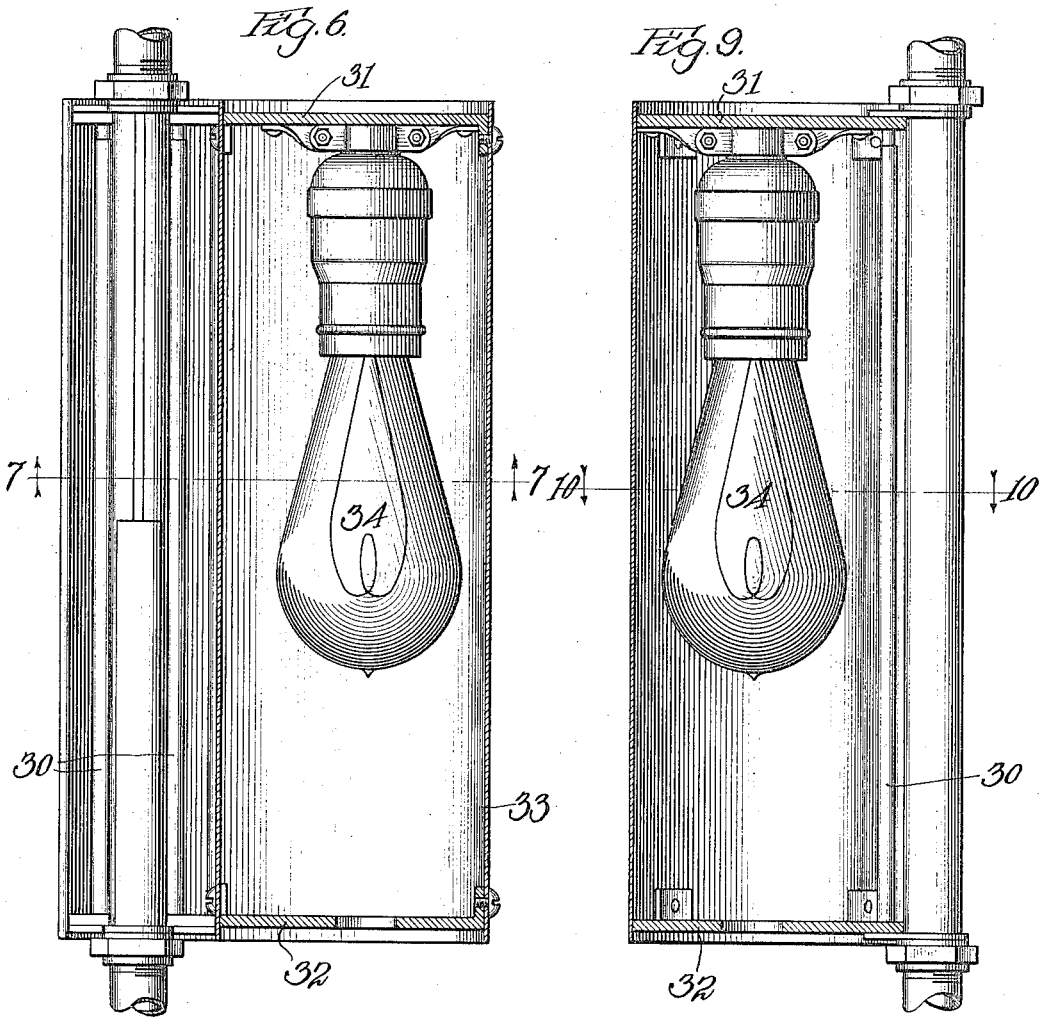
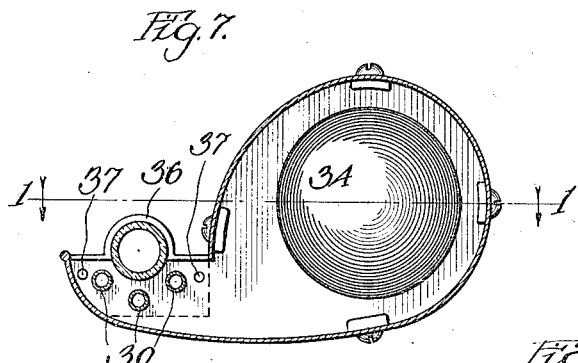
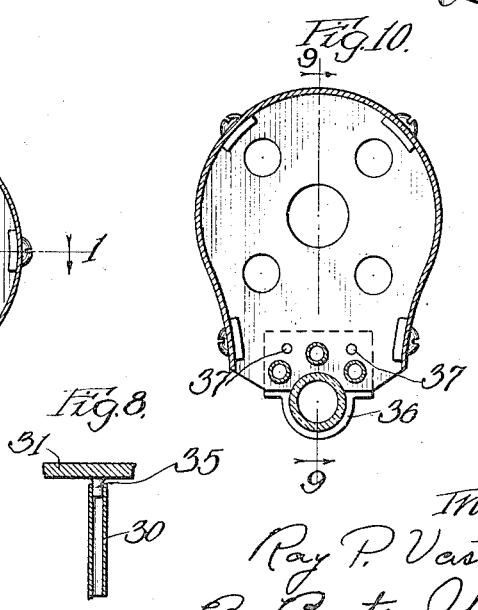

UNITED STATES PATENT OFFICE.

RAY P. VASTINE, OF CHICAGO, ILLINOIS, ASSIGNOR TO REORDWAY MANUFACTURING AND SALES CO., OF CHICAGO, ILLINOIS, A CORPORATION OF ILLINOIS.

GAGE-GLASS ILLUMINATOR.

1,293,993.      Specification of Letters Patent.      Patented Feb. 11, 1919.

Application filed October 20, 1914. Serial No. 867,629.

*To all whom it may concern:*

Be it known that I, RAY P. VASTINE, a citizen of the United States, residing at Chicago, in the county of Cook and State of Illinois, have invented certain new and useful Improvements in Gage-Glass Illuminators, of which the following is a description.

My invention relates to that class of devices known as gage glasses for showing the height of water in a tank, boiler or other container.

The object of my invention is to provide simple, convenient and durable means for rendering the fluid in a gage glass distinctly visible preferably providing means for causing the empty portion or part filled only with air or other invisible gas or vapors to appear of one color and the part filled with water or other liquid to appear colored to vividly contrast with the empty portion.

To this end my invention consists in the novel construction, arrangement and combination of parts herein shown and described, and more particularly pointed out in the claims.

In the accompanying drawings wherein like or similar reference characters indicate like or corresponding parts.

Figure 1 is a vertical section of my device shown in relation to a gage glass taken substantially on line 1—1 of Fig. 2.

Fig. 2 is a section taken substantially on line 2—2 of Fig. 1.

Figs. 3, 4 and 5 are each sections similar to Fig. 2 but each showing a slightly modified form of my device.

Fig. 6 is a vertical section of a modified form of my device taken substantially on line 6—6 of Fig. 7.

Fig. 7 is a section taken substantially on line 7—7 of Fig. 6.

Fig. 8 is a sectional detail of a convenient method for securing glass or metal tubes in my device for providing the color bands.

Fig. 9 is a section of a slightly modified form of my device taken substantially on line 9—9 of Fig. 10.

Fig. 10 is a section taken substantially on line 10—10 of Fig. 9.

In the drawings for the purpose of illustration I have shown my device attached directly to a gage glass of a boiler or other device where it is desired to accurately observe the height of water or other substantially colorless or transparent fluid.

In the form shown my device consists of a top plate 1 having a curved recess 2 in its front edge adapted to fit against the gage glass 3 with a chain 4 or other suitable means adapted to coöperate with the upper fitting 5 of the glass or other convenient means for securing my device in position. A lower plate 6 of substantially the same form as the top plate 2 is provided having a similar recess 7 in its front edge for engaging the glass. A shell 8 formed of any suitable material extends between the plates 1 and 6 and is preferably attached to the plates at its extremities by suitable screws or bolts 10 extending through the shell and engaging the lugs or projections 9 upon the respective plates.

In the preferred construction a plurality of rods or bars 11 preferably formed of glass or other transparent material are provided, preferably three, one at the rear and one at each side of, and each in close proximity to, the gage glass. In the preferred construction the rods 11 are rectangular in section with one face of each rod substantially parallel with the adjacent side of the gage glass and coated with some transparent coloring material to provide a colored band 18 at the face of the rod 11 adjacent the glass. The position of the rods 11 in relation to the gage glass is preferably such as to bring the adjacent face of each rod or in other words, each band 18 at the optical focus of the gage glass 3 when the same is filled with water or other fluid so that when looking through the filled portion of the glass the lateral dimension of the colored band is greatly magnified; the width of the bands 18 may be the same as the thickness of the rods 11 although this is immaterial. In the preferred construction however, the width of each band is such that when magnified as described its apparent lateral dimension will substantially equal the diameter of the gage glass. The actual width of the band however is maintained as small as possible so that the portion seen through the upper or substantially empty portion of the gage glass will appear very small and will not materially obstruct the view of the interior of the shell or screen, this effect is considerably increased by the fact that the empty portion of the glass tends to reduce the apparent lateral dimension of the band when seen through the glass.

The rods 11 may be secured in position in any suitable manner. As shown, the plates 1 and 6 are each provided with suitably formed sockets 12 and 14 respectively for each rod 11 each socket being formed to receive the end of a rod to rigidly maintain the same in position.

In the preferred construction also suitable means are provided to illuminate the interior of the shell to render the several parts of my device more clearly visible. In the preferred form shown an electric light 15 is positioned within the shell and secured to the plate 1 in any convenient manner. A screen 16 formed of ground or frosted glass or other suitable light dispersing means is also preferably provided positioned between the rods 11 and the light to soften and tone down the light to avoid any unpleasant glare and also to form a substantially uniform white or bright back ground contrasting sharply with the colored bands 18. In the form shown also a metal or other opaque shade 17 is rigidly attached to the plate 1 with a bifurcated part positioned between the lamp 15 and screen 16. The shade 17 is so formed and positioned that the direct rays of the lamp are interrupted adjacent the screen thus rendering the illumination of the screen substantially uniform over its entire surface.

In operation the device is hung in position upon the gage glass and the light entering the rods 11 is reflected to and brilliantly illuminates the colored band upon each rod so that an observer looking at the gage glass from almost any angle at the front of the glass sees the glass apparently more or less filled, according to the amount of liquid in the glass, with a liquid of the color of the bands 18 while the portion of the glass above the liquid merely showing a thread of color on a soft white back-ground rendering the liquid in the glass distinctly visible even at long distances, farther in fact than the glass itself would be visible without my improved device.

In the form shown in Fig. 3 the several parts are constructed substantially as hereinbefore described except, that in place of the translucent screen 16 and opaque shade 17 I have provided a plurality of translucent screens 20 and 21 arranged as shown to diffuse the light as perfectly as possible.

In Fig. 4 the rods 22 and screen 23 are formed integral or rigidly connected the screen being curved sufficiently to arrange the projecting vanes or rods 22 corresponding to the rods 11 substantially perpendicular to the face of the screen and the gage glass thus securing substantially the same arrangement of the parts and a slightly stronger device.

In Fig. 5 the rods are entirely omitted and a single band 25 of substantially the same width as the bands at the faces of the rods 17 is provided upon the face of the screen 26 which is otherwise similar to the screen 16 shown in Fig. 2 but moved sufficiently toward the gage glass to bring the band 25 to substantially the optical focus of the filled part of the gage glass. In the form shown in Figs. 6 and 7 cylindrical opaque or colored glass rods or glass tubes coated upon their interior or filled with an opaque or colored substance or metal tubes 30 are provided arranged as hereinbefore described at substantially the optical focus of the filled part of the gage glass. In this form the top and bottom plates 31 and 32 respectively as well as the shell 33 which is preferably enameled on the inside to serve as a reflector are so formed that the light 34 is positioned at the side of the gage glass and totally screened from view and the light is reflected out of the shell at the back of the gage glass illuminating the tubes 34 from the back and side.

In the form shown in Figs. 9 and 10 the several parts are so constructed and arranged that the light is positioned directly back of the gage glass and rods and while this form is slightly simpler in construction it has the disadvantage of compelling the observer to look directly at the light itself when observing the height of fluid in the glass.

In the form shown in Figs. 6 to 10 inclusive the rods which are shown as tubes are held in position by small projections 35 on the plates 31 and 32 each projection being of suitable form and size to snugly fit the end of the tube as shown in Fig. 8. In this form also the device is held in position by suitable bands or clamps 36 extending across the front of the glass and attached to the plates at the top and bottom of the shell by suitable screws 37 or other convenient means. The operation however is substantially as hereinbefore described.

Having thus described my improvement it is obvious that various immaterial modifications may be made in my device without departing from the spirit of my invention, hence I do not wish to be understood as limiting myself to the exact form or construction shown.

What I claim as new and desire to secure by Letters Patent is:

1. In a device of the kind described having a transparent tube partially filled with liquid, a colored band spaced from the wall of said tube, means engaging the extremities only of said tube and band for supporting said band at substantially the optical focus of the filled tube, and a screen spaced from said band and positioned at the opposite side of said band from said tube.

2. In a device of the kind described having a transparent tube partially filled with liquid, a colored band spaced from the wall of said tube, and means for supporting said band at substantially the optical focus of the filled tube and a screen spaced from said band positioned at the opposite side of said band from said tube, the color of said screen contrasting sharply with the color of said band.

3. In a device of the kind described having a transparent tube partially filled with liquid, a colored band spaced from the wall of said tube, means for supporting said band at substantially the optical focus of the filled tube, a light and an opaque shade positioned between said light and tube.

4. In a device of the kind described having a transparent tube partially filled with liquid, a plurality of colored bands and means connected to said tube for supporting each of said bands substantially parallel to said tube and at substantially the optical focus of the filled tube.

5. In a device of the kind described having a transparent tube partially filled with liquid, a plurality of colored bands, means attached to said tube for supporting each of said bands substantially parallel to and spaced from the wall of said tube at substantially the optical focus of the filled tube, a screen spaced from said bands and positioned at the opposite side of said bands from said tube, and means for illuminating said bands and screen.

6. In a device of the kind described having a transparent tube partially filled with liquid, a colored band, means for supporting said band substantially parallel to and spaced from the wall of said tube at substantially the optical focus of the filled tube, a screen spaced from said band and positioned at the opposite side of said band from said tube, and means for illuminating said band and screen.

7. In a device of the kind described having a transparent tube partially filled with liquid, a colored band, means for supporting said band substantially parallel to and spaced from the wall of said tube at substantially the optical focus of the filled tube, a screen spaced from said band and positioned at the opposite side of said band from said tube colored to sharply contrast with the color of said band and a light and an opaque shade positioned between said light and tube.

8. In a device of the kind described having a transparent tube partially filled with liquid, a colored transparent band, means connected to said tube for supporting said band at a distance from said tube substantially equal to the optical focus of the filled tube, a screen spaced from said band and positioned at the opposite side of said band from said tube, means for illuminating said band and screen, and means for equalizing the illumination throughout its length of said band.

In testimony whereof: I have hereunto signed my name in the presence of two subscribing witnesses.

RAY P. VASTINE.

Witnesses:
BLANCHE CHALMERS,
BURTON U. HILLS.